US012568407B2

(12) United States Patent
Hong

(10) Patent No.: US 12,568,407 B2
(45) Date of Patent: Mar. 3, 2026

(54) CELL HANDOVER METHOD AND APPARATUS, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 555 days.

(21) Appl. No.: 17/926,100

(22) PCT Filed: May 18, 2020

(86) PCT No.: PCT/CN2020/090900
§ 371 (c)(1),
(2) Date: Nov. 17, 2022

(87) PCT Pub. No.: WO2021/232206
PCT Pub. Date: Nov. 25, 2021

(65) Prior Publication Data
US 2023/0199576 A1     Jun. 22, 2023

(51) Int. Cl.
| | |
|---|---|
| *H04W 36/00* | (2009.01) |
| *H04W 8/20* | (2009.01) |
| *H04W 76/20* | (2018.01) |
| *H04W 88/06* | (2009.01) |

(52) U.S. Cl.
CPC ......... *H04W 36/0058* (2018.08); *H04W 8/20* (2013.01); *H04W 36/0069* (2018.08); *H04W 76/20* (2018.02); *H04W 88/06* (2013.01)

(58) Field of Classification Search
CPC ......... H04W 36/0058; H04W 36/0069; H04W 36/0011; H04W 36/08; H04W 8/20; H04W 8/183; H04W 76/20
See application file for complete search history.

(56) References Cited

U.S. PATENT DOCUMENTS

| | | | |
|---|---|---|---|
| 2012/0314610 A1 | 12/2012 | Hou | |
| 2014/0146732 A1* | 5/2014 | Olufunmilola | ....... H04L 5/0073 370/329 |
| 2016/0338077 A1 | 11/2016 | Chin et al. | |

(Continued)

FOREIGN PATENT DOCUMENTS

| | | |
|---|---|---|
| CN | 102421121 A | 4/2012 |
| CN | 102421130 A | 4/2012 |

(Continued)

OTHER PUBLICATIONS

ISA State Intellectual Property Office of the People's Republic of China, International Search Report Issued in Application No. PCT/CN2020/090900, Feb. 20, 2021, WIPO, 4 pages.

(Continued)

*Primary Examiner* — Jamal Javaid
(74) *Attorney, Agent, or Firm* — Volpe Koenig

(57) ABSTRACT

A cell handover method. The cell handover method includes: when a first Subscriber Identity Module (SIM) in a multi-SIM terminal is in a connected state, informing, by the first SIM, a second SIM in the multi-SIM terminal of performing network measurement; and when a network measurement result from the second SIM is obtained, reporting, by the first SIM, the network measurement result to a base station to which the first SIM is connected.

12 Claims, 15 Drawing Sheets

Inform, by a first SIM in a multi-SIM terminal when the first SIM is in a connected state, a second SIM in the multi-SIM terminal of performing network measurement — 101

Report, when the first SIM obtains a network measurement result from the second SIM, the network measurement result to a base station to which the first SIM is connected — 102

(56)                References Cited

U.S. PATENT DOCUMENTS

| | | |
|---|---|---|
| 2017/0359813 A1* | 12/2017 | Lee ................... H04W 52/0212 |
| 2018/0070303 A1 | 3/2018 | Tambaram Kailasam et al. |
| 2018/0098238 A1 | 4/2018 | Saxena et al. |
| 2020/0053585 A1 | 2/2020 | Saxena et al. |
| 2020/0396714 A1 | 12/2020 | Lee |

FOREIGN PATENT DOCUMENTS

| | | |
|---|---|---|
| CN | 104350776 A | 2/2015 |
| CN | 104796963 A | 7/2015 |
| CN | 104902528 A | 9/2015 |
| CN | 105873099 A | 8/2016 |
| CN | 106454965 A | 2/2017 |
| CN | 106604332 A | 4/2017 |
| CN | 106658629 A | 5/2017 |
| CN | 107889050 A | 4/2018 |
| CN | 109644391 A | 4/2019 |
| CN | 110495208 A | 11/2019 |
| CN | 110521236 A | 11/2019 |
| CN | 110546993 A | 12/2019 |
| CN | 110677890 A | 1/2020 |
| CN | 110710262 A | 1/2020 |
| CN | 110730484 A | 1/2020 |
| CN | 111065134 A | 4/2020 |
| WO | 2012012668 A1 | 1/2012 |
| WO | 2012/041735 A1 | 4/2012 |
| WO | 2012089596 A1 | 7/2012 |
| WO | 2015180126 A1 | 12/2015 |
| WO | 2016164396 A1 | 10/2016 |
| WO | 2017172376 A1 | 10/2017 |
| WO | 2018141148 A1 | 8/2018 |
| WO | 2019164325 A1 | 8/2019 |

OTHER PUBLICATIONS

State Intellectual Property Office of the People's Republic of China, Office Action and Search Report Issued in Application No. 2020800010064, Jan. 6, 2022, 21 pages.(Submitted with Machine/ Partial Translation).

State Intellectual Property Office of the People's Republic of China, Office Action and Search Report Issued in Application No. 2020800010064, Aug. 9, 2022, 19 pages.(Submitted with Machine/ Partial Translation).

NextNav, Broadcom, AT&T, TCS, "RAT-Independent positioning enhancements", 3GPP TSG-RAN WG2 #91-bis Malmo, Sweden, Oct. 5-9, 2015, R2-154959R2-154733, 18 pages.

European Patent Office, Extended European Search Report Issued in Application No. 20936905.7, Jan. 24, 2024, Germany, 11 pages.

Intellectual property India, Hearing Notice in Reference of Application No. 202247069124, Mar. 19, 2024, 4 pages.

India Office Action issued on Feb. 22, 2023 for Indian Patent Application No. 202247069124.

ISA State Intellectual Property Office of the People's Republic of China, Written Opinion of the International Searching Authority Issued on Feb. 20, 2021 for Chinese Patent Application No. PCT/ CN2020/090900.

Xiangmei, L. "Research on 4G/5G Multi Network Cooperation and Interoperability", Mobile communication (2019).

* cited by examiner

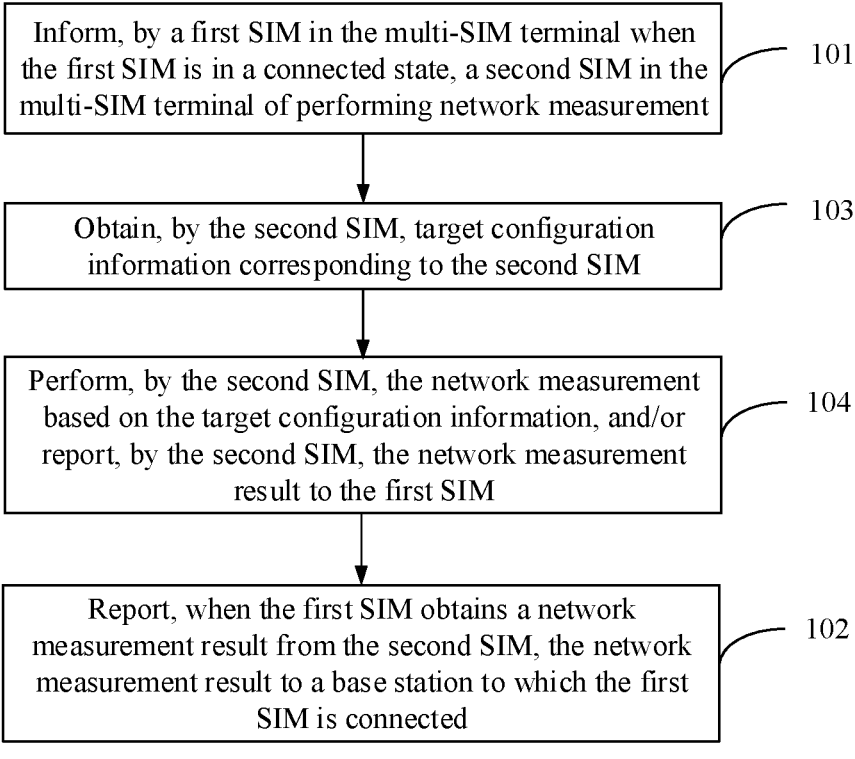

Inform, by a first SIM in the multi-SIM terminal when the first SIM is in a connected state, a second SIM in the multi-SIM terminal of performing network measurement — 101

Obtain, by the second SIM, target configuration information corresponding to the second SIM — 103

Perform, by the second SIM, the network measurement based on the target configuration information, and/or report, by the second SIM, the network measurement result to the first SIM — 104

Report, when the first SIM obtains a network measurement result from the second SIM, the network measurement result to a base station to which the first SIM is connected — 102

FIG.3

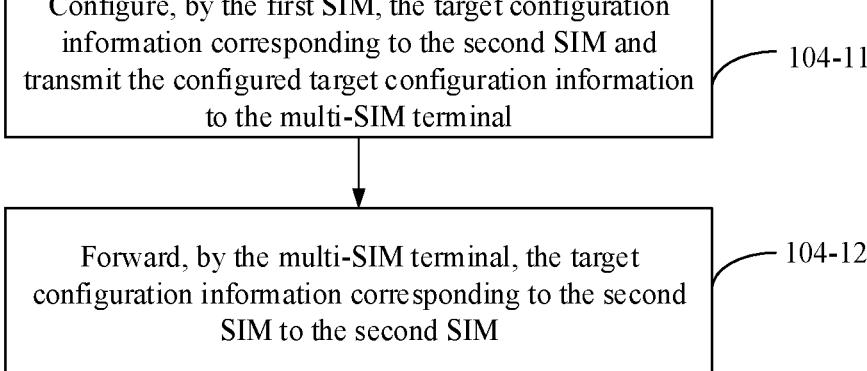

Configure, by the first SIM, the target configuration information corresponding to the second SIM and transmit the configured target configuration information to the multi-SIM terminal — 104-11

Forward, by the multi-SIM terminal, the target configuration information corresponding to the second SIM to the second SIM — 104-12

FIG.4

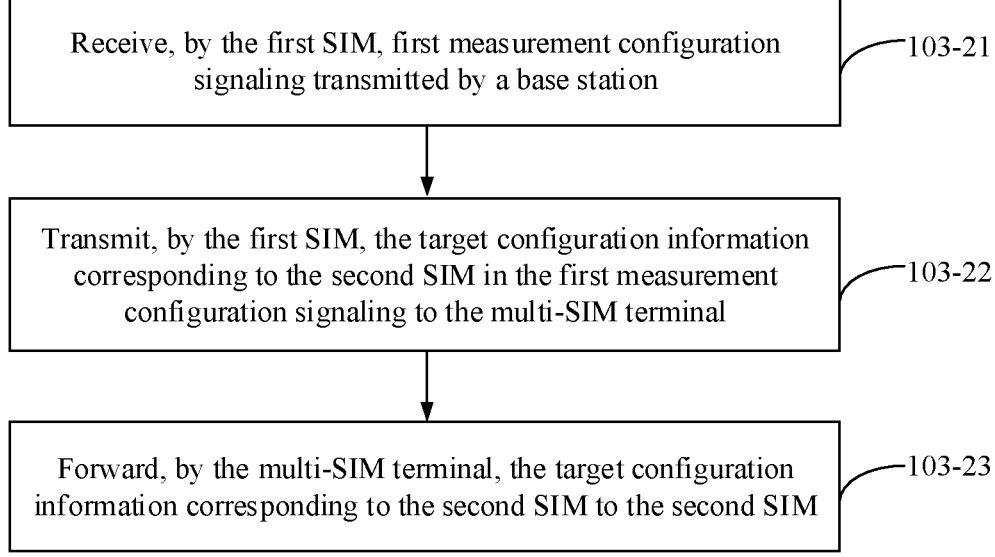

Receive, by the first SIM, first measurement configuration
signaling transmitted by a base station　　103-21

Transmit, by the first SIM, the target configuration information
corresponding to the second SIM in the first measurement
configuration signaling to the multi-SIM terminal　　103-22

Forward, by the multi-SIM terminal, the target configuration
information corresponding to the second SIM to the second SIM　　103-23

FIG.5

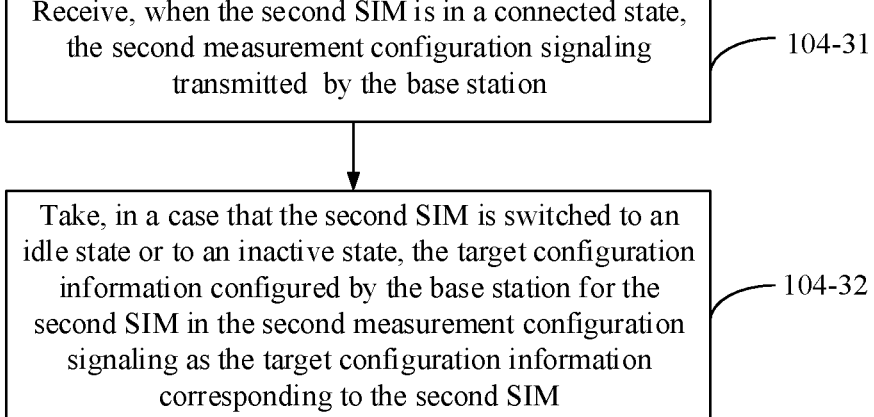

Receive, when the second SIM is in a connected state,
the second measurement configuration signaling
transmitted by the base station　　104-31

Take, in a case that the second SIM is switched to an
idle state or to an inactive state, the target configuration
information configured by the base station for the
second SIM in the second measurement configuration
signaling as the target configuration information
corresponding to the second SIM　　104-32

FIG.6

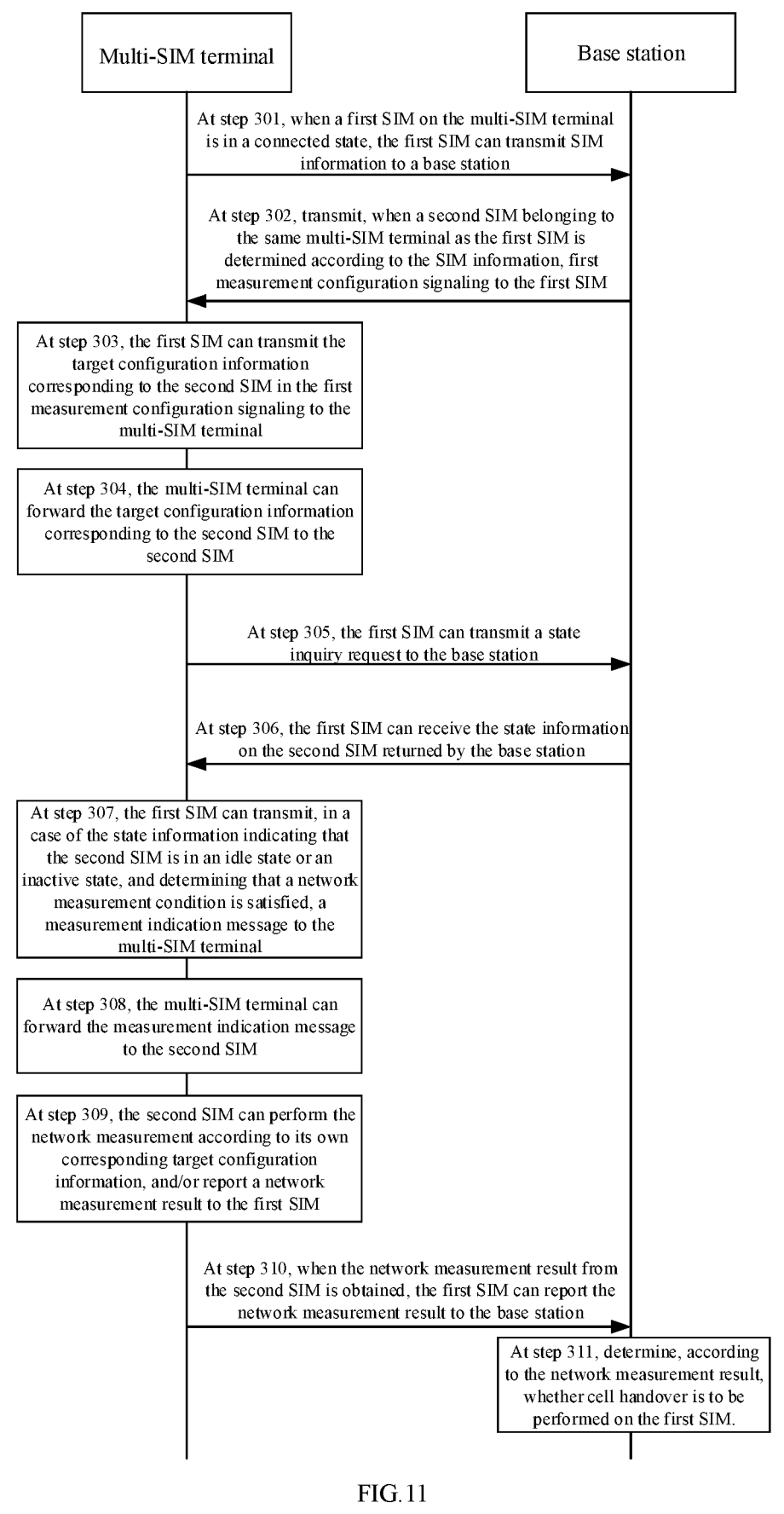

```
┌─────────────────────┐                    ┌─────────────────────┐
│  Multi-SIM terminal │                    │    Base station     │
└─────────────────────┘                    └─────────────────────┘
```

At step 301, when a first SIM on the multi-SIM terminal is in a connected state, the first SIM can transmit SIM information to a base station At step 302, transmit, when a second SIM belonging to the same multi-SIM terminal as the first SIM is determined according to the SIM information, first measurement configuration signaling to the first SIM At step 303, the first SIM can transmit the target configuration information corresponding to the second SIM in the first measurement configuration signaling to the multi-SIM terminal At step 304, the multi-SIM terminal can forward the target configuration information corresponding to the second SIM to the second SIM At step 305, the first SIM can transmit a state inquiry request to the base station At step 306, the first SIM can receive the state information on the second SIM returned by the base station At step 307, the first SIM can transmit, in a case of the state information indicating that the second SIM is in an idle state or an inactive state, and determining that a network measurement condition is satisfied, a measurement indication message to the multi-SIM terminal At step 308, the multi-SIM terminal can forward the measurement indication message to the second SIM At step 309, the second SIM can perform the network measurement according to its own corresponding target configuration information, and/or report a network measurement result to the first SIM At step 310, when the network measurement result from the second SIM is obtained, the first SIM can report the network measurement result to the base station At step 311, determine, according to the network measurement result, whether cell handover is to be performed on the first SIM.

FIG.11

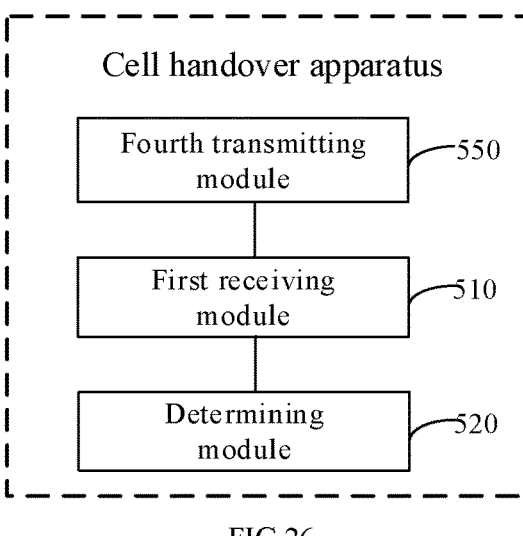
FIG.26
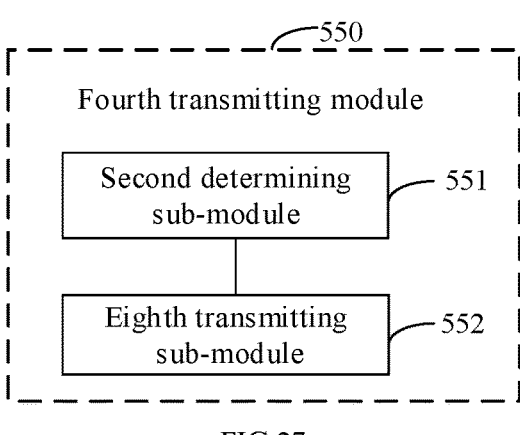
FIG.27
Cell handover apparatus
Fifth transmitting module —560
First receiving module —510
Determining module —520
FIG.28

CELL HANDOVER METHOD AND APPARATUS, AND STORAGE MEDIUM

CROSS REFERENCE TO RELATED APPLICATIONS

The present application is the U.S. national phase of PCT Application No. PCT/CN2020/090900 filed on May 18, 2020, which is incorporated herein by reference in its entirety.

TECHNICAL FIELD

The present application relates to the field of communication, in particular to cell handover methods, apparatuses, and storage media.

BACKGROUND

With the development of wireless communication technologies, a growing number of multi-Subscriber Identity Module (multi-SIM) terminals emerge. Typical application scenarios of a multi-SIM terminal may include the following two scenarios.

In a first scenario, a business user may have a private SIM and a business SIM, and put both the two SIMs in the same terminal.

In a second scenario, an ordinary user may have a plurality of private SIMs, and choose which SIM to use according to services.

SIMs in a multi-SIM terminal may be provided by the same operator or different operators.

At present, processing manners for multi-SIM terminals are mainly based on implementation of various terminal manufacturers, with no unified standard for regulation. This has resulted in many different terminal behaviors and processing manners, such as, dual SIM single standby, dual SIM dual standby, dual SIM dual active, and the like. For a multi-SIM terminal, a current network takes different SIMs as different terminals, and the network communicates with each SIM independently. The SIMs have no cooperation with each other.

For each SIM, during handover, a terminal can perform network measurement on one or more neighboring cells according to measurement configuration information from a base station, and report a network measurement result to the base station when a reporting condition is satisfied. The base station can determine whether to allow the terminal to perform cell handover according to the network measurement result reported by the terminal. This process may result in long handover time and handover time delay.

SUMMARY

To overcome the technical problems in the related art, embodiments of the present disclosure provide cell handover methods, apparatuses, and storage media.

According to a first aspect of the present disclosure, there is provided a cell handover method, being applicable to a multi-Subscriber Identity Module (SIM) terminal. The method includes: informing, by a first SIM in the multi-SIM terminal when the first SIM is in a connected state, a second SIM in the multi-SIM terminal of performing network measurement; and reporting, by the first SIM when the first SIM obtains a network measurement result from the second SIM, the network measurement result to a base station to which the first SIM is connected.

According to a second aspect of the present disclosure, there is provided a cell handover method, being applicable to a base station. The method includes: receiving a network measurement result reported by a first Subscriber Identity Module (SIM) in a connected state in a multi-SIM terminal, where the network measurement result is obtained by another SIM in the multi-SIM terminal performing network measurement; and determining, according to the network measurement result, whether cell handover is to be performed on the first SIM.

According to a third aspect of the present disclosure, there is provided a cell handover device, including: a processor, a memory for storing instructions executable by the processor; where the processor is configured to perform the cell handover method according to any one of the first aspect.

According to a fourth aspect of the present disclosure, there is provided a cell handover device, including: a processor, a memory for storing instructions executable by the processor; where the processor is configured to perform the cell handover method according to any one of the second aspect.

It should be understood that the above general description and the following detailed description are just exemplary and explanatory, and cannot construed as a limit to the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

FIG. 3 is a schematic flowchart of another cell handover method illustrated in accordance with an example.

FIG. 4 is a schematic flowchart of another cell handover method illustrated in accordance with an example.

FIG. 5 is a schematic flowchart of another cell handover method illustrated in accordance with an example.

FIG. 6 is a schematic flowchart of another cell handover method illustrated in accordance with an example.

FIG. 11 is a schematic flowchart of another cell handover method illustrated in accordance with an example.

FIG. 26 is a block diagram of another cell handover apparatus illustrated in accordance with an example.

FIG. 27 is a block diagram of another cell handover apparatus illustrated in accordance with an example.

FIG. 28 is a block diagram of another cell handover apparatus illustrated in accordance with an example.

DETAILED DESCRIPTION OF THE EMBODIMENTS

Figure 1:
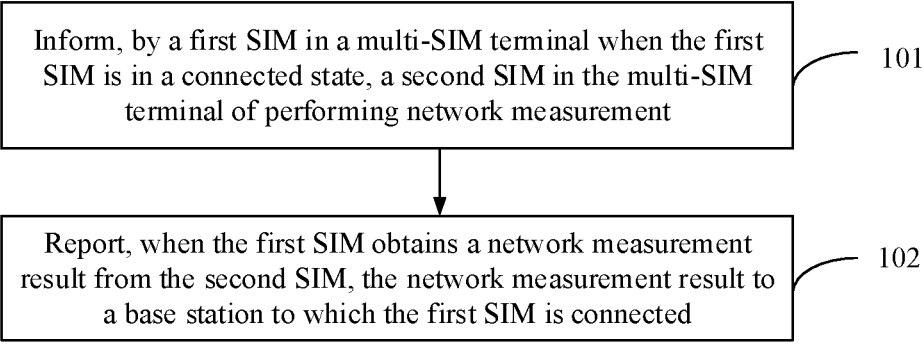
FIG. 1 is a schematic flowchart of a cell handover method illustrated in accordance with an example.

Exemplary embodiments will be described in detail herein, with the illustrations thereof represented in the drawings. When the following descriptions involve the drawings, like numerals in different drawings refer to like or similar elements unless otherwise indicated. The manners described in the following exemplary embodiments do not represent all manners consistent with the embodiments of the present disclosure. Rather, they are merely examples of apparatuses and methods consistent with some aspects of the present disclosure as detailed in the appended claims.

The terms used in the present disclosure are for the purpose of describing particular embodiments only and are not intended to limit the present disclosure. Terms determined by "a", "the", and "said" in their singular forms in the embodiments of the present disclosure and the appended claims are also intended to include a plurality unless clearly indicated otherwise in the context. It should also be understood that the term "and/or" as used herein refers to and includes any and all possible combinations of one or more of the items listed in the associated list.

It should be understood that although the terms "first," "second," "third," and the like may be used in the present disclosure to describe various information, such information should not be limited to these terms. These terms are only used to distinguish one category of information from another. For example, without departing from the scope of the disclosure, the first information may be referred to as second information. Similarly, the second information may also be referred to as the first information. Depending on the context, the term "if" as used herein may be interpreted as "when" or "upon" or "in response to determining".

First, the cell handover methods provided by the present disclosure are introduced from a multi-SIM terminal side.

Embodiments of the present disclosure provide a cell handover method, which can be applied to a multi-SIM terminal. Referring to FIG. 1, which is a flowchart showing a cell handover method in accordance with an example. The method includes the following steps.

At step 101, when a first SIM in the multi-SIM terminal is in a connected state, a second SIM in the multi-SIM terminal is informed, by the first SIM, of performing network measurement.

In the embodiments of the present disclosure, the first SIM and the second SIM belong to the same multi-SIM terminal, where the first SIM is a SIM in the connected state, and the second SIM is any one of the other SIMs in the same multi-SIM terminal.

At step 102, when the first SIM obtains a network measurement result reported by the second SIM, the first SIM reports the network measurement result to a base station to which the first SIM is connected.

In the embodiments of the present disclosure, the first SIM reports, when the network measurement result reported by the second SIM is obtained, the network measurement result to the base station as its own network measurement result. The base station determines whether cell handover is to be performed on the first SIM according to the network measurement result.

In the above-mentioned embodiments, while the first SIM on the multi-SIM terminal is configured to perform service processing, the second SIM on the multi-SIM terminal is configured to perform network measurement. Since the first SIM and the second SIM belong to the same multi-SIM terminal, a network measurement result obtained by the second SIM may be similar to a network measurement result obtained by the first SIM. In this way, by taking advantage of the multi-SIM terminal, the network measurement can be performed in advance through other SIMs on the multi-SIM terminal without affecting the service(s) of the first SIM, which can shorten the time length and time delay of handover and make the handover faster.

Figure 2:
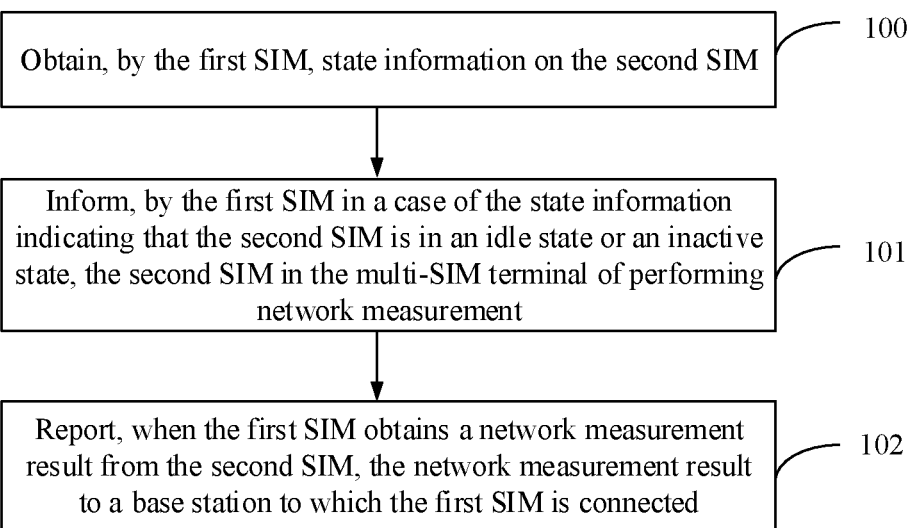
FIG. 2 is a schematic flowchart of another cell handover method illustrated in accordance with an example.

In an embodiment, referring to FIG. 2, which is a flowchart of another cell handover method illustrated according to the embodiment in FIG. 1. The above-mentioned method further includes:

at step 100, state information on the second SIM is obtained by the first SIM.

In the embodiments of the present disclosure, when the first SIM is in the connected state, to alleviate affecting service(s) of the second SIM, in a case of the state information indicating that the second SIM is in an idle state or an inactive state, the first SIM can inform the second SIM of performing the network measurement.

In a case where the second SIM is in the connected state as well, the network measurement can be performed by another SIM in the idle or inactive state.

In the above embodiments, to alleviate affecting service (s) of the second SIM on the multi-SIM terminal, the first SIM can obtain the state information on the second SIM, so as to make the second SIM perform the network measurement when the second SIM is in the idle state or the inactive state, which has high availability.

In an embodiment, for the above step 100, the first SIM may obtain the state information on the second SIM in any one of the following manners.

In a first manner, the first SIM may obtain the state information on the second SIM from the multi-SIM terminal.

In the embodiments of the present disclosure, the second SIM may inform the multi-SIM terminal of its own state information, for example, informing a Central Processing Unit (CPU) of the multi-SIM terminal. The first SIM may obtain the state information on the second SIM through interaction with the multi-SIM terminal.

In a second manner, the first SIM may obtain the state information on the second SIM from a network side.

In the embodiments of the present disclosure, the first SIM may transmit a state inquiry request to a base station to which the first SIM is connected. The state query request is used to query the state information on the second SIM.

The base station can determine, according to information on SIMs to which connections with the base station are established and information on SIMs camping on the base station, the state information on the second SIM, and transmit the determined state information to the first SIM.

When the first SIM obtains the state information on the second SIM using any of the above-mentioned manners, the first SIM can make the second SIM perform the network measurement in a case that the second SIM is in the idle state or the inactive state.

In the above embodiments, the first SIM may obtain the state information on the second SIM reported by the second SIM to the multi-SIM terminal, or the first SIM may query the network side for the state information on the second SIM, which is easy to implement and has high availability.

In an embodiment, for the above step 101, the first SIM may notify the second SIM of performing the network measurement once entering the connected state.

Or, the first SIM may notify, while being in the connected state and determining that a network measurement condition is satisfied, the second SIM on the multi-SIM terminal of performing the network measurement.

For example, the network measurement condition may include: network signal quality related to the first SIM is lower than a predetermined threshold for more than a predetermined period of time, and/or a requirement related to Quality of Service (QoS) for the first SIM meets a predetermined condition. The predetermined condition may further include at least one of a time delay of the service is lower than a first threshold, jitter of the service is lower than a second threshold, or a transmission rate of the service is higher than a third threshold.

The network signal quality related to the first SIM is lower than the predetermined threshold for more than the predetermined period of time, indicating that the place where the first SIM is currently located has a poor network signal, and cell handover is probably to be performed on the first SIM. In this case, the first SIM can inform the second SIM of performing network measurement, thereby performing the network measurement in advance, shortening the time length and time delay of cell handover, and speeding up the cell handover process.

The requirement related to the QoS for the first SIM meets the predetermined condition, for example, the first SIM determines that cell handover may be performed according to its own wireless service requirements. The first SIM can notify the second SIM of performing network measurement, which can realize performing the network measurement in advance, shortening the time length and time delay of cell handover, and speeding up the cell handover process as well.

In an embodiment, for the above step 101, the first SIM can transmit a measurement indication message to the multi-SIM terminal, where the measurement indication message is used to indicate to the second SIM to perform the network measurement. The multi-SIM terminal can receive and forward the measurement indication message to the second SIM, and the second SIM can start to perform the network measurement based on the measurement indication message.

In an embodiment, referring to FIG. 3, which is a flowchart of another cell handover method illustrated according to the embodiment shown in FIG. 1, the above-mentioned method further includes the following.

At step 103, target configuration information corresponding to the second SIM is obtained by the second SIM.

The target configuration information includes at least one of the following:

measurement configuration information indicating a measurement content for the second SIM to perform the network measurement; or reporting configuration information indicating a condition for the second SIM to report the network measurement result to the first SIM.

For example, the measurement configuration information may include at least one of the following: a list of frequencies to be measured, a list of cells to be measured, a list of beams to be measured, and a target value to be measured. The target value may be a value of a signal related to cell handover, which may include, but is not limited to, Reference Signal Receiving Power (RSRP) and/or Reference Signal Receiving Quality (RSRQ).

The reporting configuration information may include at least one of the following: a reporting condition or a reporting opportunity.

The reporting condition may include that a signal strength of a neighboring cell exceeds a signal strength of the current cell for a period of time. Meanwhile, a difference between the signal strength of the neighboring cell and the signal strength of the current cell is more than a fourth threshold. In the embodiments of the present disclosure, the fourth threshold may be lower than a threshold of a cell's signal strength configured by the base station for the current cell.

The reporting opportunity may include, but is not limited to, reporting according to a request from the first SIM, and/or reporting when a cell meeting a measurement reporting condition is found.

At step 104, the second SIM performs the network measurement based on the target configuration information, and/or reports the network measurement result to the first SIM.

In the embodiments of the present disclosure, the second SIM can perform the network measurement according to the measurement configuration information in the target configuration information, and/or report, when the condition indicated by the reporting configuration information is satisfied, the network measurement result to the first SIM.

In an embodiment, for the above-mentioned step 103, the second SIM may obtain the target configuration information corresponding to itself in any of the following manners.

In a first manner, the first SIM may configure corresponding target configuration information for the second SIM and transmit the corresponding target configuration information to the second SIM.

FIG. 4 is a flowchart of another cell handover method illustrated according to the embodiment shown in FIG. 3. Referring to FIG. 4, the step 103 may include the following.

At step 103-11, the target configuration information corresponding to the second SIM is configured and transmitted to the multi-SIM terminal by the first SIM.

In the embodiments of the present disclosure, the first SIM may configure, according to its own needs, corresponding target configuration information for the second SIM, and transmit the configured target configuration information to the multi-SIM terminal.

At step 103-12, the multi-SIM terminal forwards the target configuration information corresponding to the second SIM to the second SIM.

In the embodiments of the present disclosure, when the target configuration information is received, the multi-SIM terminal can forward the target configuration information to the second SIM.

In a second manner, a network side configures the corresponding target configuration information for the second SIM, and transmits it to the first SIM through signaling. The first SIM forwards the corresponding target configuration information to the second SIM through a multi-SIM terminal.

Referring to FIG. 5, which is a flowchart of another cell handover method illustrated according to the embodiment shown in FIG. 3, the step 103 may include the following.

At step 103-21, the first SIM receives first measurement configuration signaling transmitted by a base station.

Measurement configuration (MeasConfig) signaling is signaling transmitted by a base station to a SIM in a connected state to perform network measurement. In the embodiments of the present disclosure, the base station can obtain the first measurement configuration signaling by modifying the MeasConfig signaling, and the first measurement configuration signaling may carry respective target configuration information configured by the base station for the first SIM and the second SIM belonging to the same multi-SIM terminal.

For example, the first SIM can further transmit SIM information to the base station, thereby making the base station determine, according to the SIM information, that the first SIM and the second SIM belong to the same multi-SIM terminal, and to transmit the first measurement configuration signaling to the first SIM.

At step 103-22, the target configuration information corresponding to the second SIM in the first measurement configuration signaling is transmitted to the multi-SIM terminal by the first SIM.

When the first measurement configuration signaling is received, the first SIM can transmit the included target configuration information corresponding to the second SIM to the multi-SIM terminal.

At step 103-23, the target configuration information corresponding to the second SIM is forwarded to the second SIM by the multi-SIM terminal.

The multi-SIM terminal can further forward the target configuration information corresponding to the second SIM to the second SIM.

In a third manner, for a second SIM in the connected state, corresponding target configuration information can be pre-configured and transmitted to the second SIM through signaling by the network side.

Referring to FIG. 6, which is a flowchart of another cell handover method illustrated according to the embodiment shown in FIG. 3, step 103 may include the following.

At step 103-31, when the second SIM is in the connected state, the second SIM receives second measurement configuration signaling transmitted by the base station.

In the embodiments of the present disclosure, when the second SIM is in the connected state, the base station may configure corresponding target measurement information for the second SIM, and transmit the configured target measurement information to the second SIM through the second measurement configuration signaling. The second measurement configuration signaling includes the target configuration information configured by the base station for the second SIM.

At step 103-32, in a case that the second SIM is switched to an idle state or to an inactive state, the target configuration information configured by the base station for the second SIM in the second measurement configuration signaling is taken as the target configuration information corresponding to the second SIM.

In the embodiments of the present disclosure, when the second SIM is switched to the idle state or the inactive state, in a case that network measurement is to be performed, the network measurement can be performed based on the target configuration information previously configured by the base station when the second SIM is in the connected state, and/or a network measurement result can be reported to the first SIM.

In the above embodiments, the second SIM can perform network measurement based on the obtained target configuration information corresponding to itself, and/or report the network measurement result to the first SIM. For example, the corresponding target configuration information for the second SIM may be configured by the first SIM. Or, the respective target configuration information may be simultaneously configured for the first SIM and the second SIM by the base station through the first configuration signaling, and the target configuration information corresponding to the second SIM may be forwarded by the first SIM to the second SIM. Or, when the second SIM is in the connected state, target configuration information can be pre-configured for the second SIM by the base station through the second configuration signaling. When the second SIM is switched to the idle state or the inactive state, the target configuration information in the second configuration information is directly used to perform network measurement and/or report a network measurement result to the first SIM. The methods have high availability.

Next, the cell handover methods provided by the present disclosure are introduced from a base station side.

Figure 7:
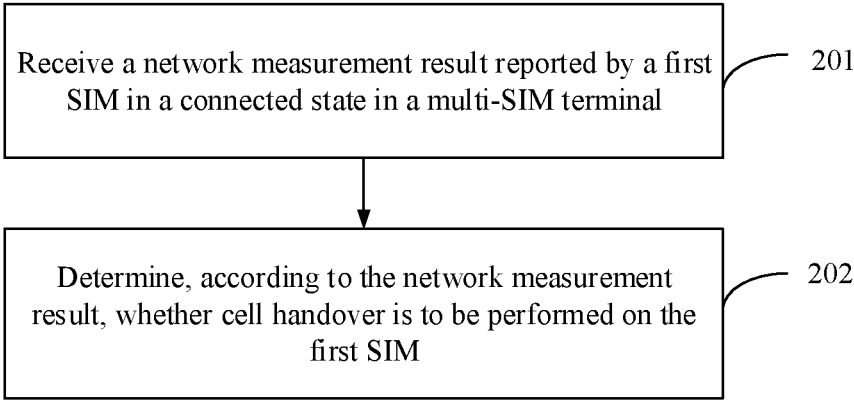
FIG. 7 is a schematic flowchart of another cell handover method illustrated in accordance with an example.

In an embodiment, referring to FIG. 7, which is a flowchart of another cell handover method illustrated according to an embodiment, the method includes the following steps.

At step 201, a network measurement result reported by a first SIM in a connected state in a multi-SIM terminal is received.

In the embodiments of the present disclosure, in a case that the first SIM in the multi-SIM terminal is in the connected state, the network measurement result is reported to the base station through a connection established with the base station. The network measurement result is not obtained from a measurement performed by the first SIM, but from a network measurement performed by another SIM on the multi-SIM terminal.

At step 202, according to the network measurement result, whether cell handover is to be performed on the first SIM is determined.

In the above embodiments, since the first SIM and the second SIM belong to the same multi-SIM terminal, a network measurement result obtained by the second SIM may be similar with a network measurement result obtained by the first SIM. According to the network measurement result reported by the first SIM, the base station determines whether the cell handover is to be performed on the first SIM, thereby taking advantages of the multi-SIM terminal, and performing network measurement in advance by other SIMs on the multi-SIM terminal without affecting service(s) of the first SIM. In this way, the time length and time delay of handover is shortened, which makes the handover faster.

Figure 8:
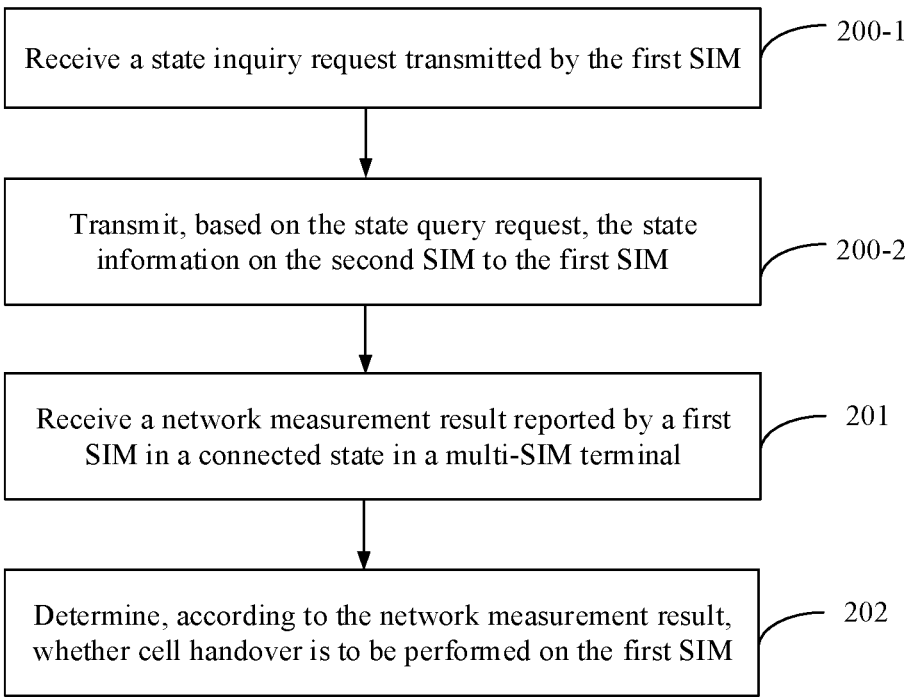
FIG. 8 is a schematic flowchart of another cell handover method illustrated in accordance with an example.

In an embodiment, referring to FIG. 8, which is a flow-chart of another cell handover method illustrated according to the embodiment shown in FIG. 7, the method may further include the following.

At step 200-1, a state inquiry request transmitted by the first SIM is received.

The state query request is used to query state information on the second SIM.

At step 200-2, based on the state query request, the state information on the second SIM is transmitted to the first SIM.

In the embodiments of the present disclosure, the base station can determine, according to information on SIMs to which connections with the base station are established, and information on SIMs camping on the base station, the state information on the second SIM. In a case that the second SIM has a connection with the base station, the state information on the second SIM may indicate that the second SIM is in a connected state. In a case that the second SIM camps on the base station, the state information on the second SIM may indicate that the second SIM is in an idle state or an inactive state. When the state information on the second SIM is determined, the base station can transmit the determined state information to the first SIM.

The first SIM can inform the second SIM of performing network measurement when the second SIM is in the idle state or the inactive state, so as to perform the network measurement without affecting service(s) of the second SIM, which has high availability.

Figure 9:
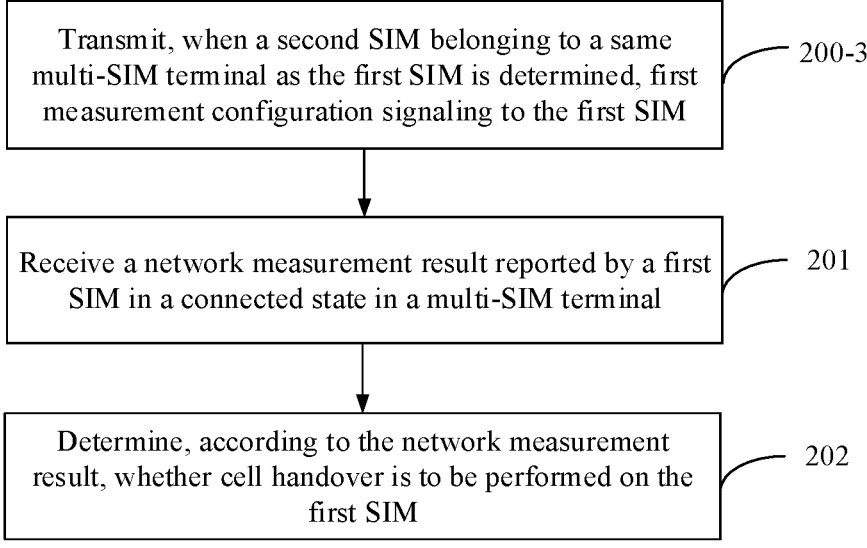
FIG. 9 is a schematic flowchart of another cell handover method illustrated in accordance with an example.

In an embodiment, referring to FIG. 9, which is a flow-chart of another cell handover method illustrated according to the embodiment shown in FIG. 7, the method may further include:

at step 200-3, when a second SIM belonging to a same multi-SIM terminal as the first SIM is determined, first measurement configuration signaling is transmitted to the first SIM.

In the embodiments of the present disclosure, the base station may determine the second SIM belonging to the same multi-SIM terminal as the first SIM in any one of the following ways.

In a first manner, the second SIM may be determined according to SIM information reported by the first SIM.

The SIM information can be used to inform the base station of information about one or more other SIMs belonging to the same multi-SIM terminal as the first SIM. The base station can take, according to the SIM information reported by the first SIM, another SIM belonging to the same multi-SIM terminal as the first SIM as the second SIM.

In a second manner, the second SIM may be determined according to SIM information transmitted by a core network.

In the embodiments of the present disclosure, the core network can transmit information about one or more other SIMs belonging to the same multi-SIM terminal as the first SIM to the base station, and the base station can take another SIM as the second SIM.

When the second SIM belonging to the same multi-SIM terminal as the first SIM is determined through any one of the above ways, the base station can transmit the first measurement configuration signaling to the first SIM.

The base station can configure respective target configuration information for the first SIM and the second SIM in the first measurement configuration signaling.

The target configuration information may include at least one of the following:

measurement configuration information indicating a measurement content for the second SIM to perform the network measurement; or reporting configuration information indicating a condition for the second SIM to report the network measurement result to the first SIM.

For example, the measurement configuration information may include at least one of the following: a list of frequencies to be measured, a list of cells to be measured, a list of beams to be measured, and a target value to be measured. The target value may be a signal value related to cell handover, which may include, but is not limited to, RSRP and/or RSRQ.

The reporting configuration information may include at least one of the following: a reporting condition or a reporting opportunity.

The reporting condition may include that a signal strength of a neighboring cell exceeds that of the current cell for a period of time, and meanwhile a difference between the signal strength of the neighboring cell and the signal strength of the current cell is more than a fourth threshold. In the embodiments of the present disclosure, the fourth threshold may be lower than a threshold of a cell's signal strength configured by the base station for the current cell.

The reporting opportunity may include, but is not limited to, reporting according to a request from the first SIM, and/or reporting when a cell meeting a measurement reporting condition is found.

When the first SIM in the multi-SIM terminal receives the first measurement configuration signaling, the target configuration information corresponding to the second SIM therein can be transmitted to the multi-SIM terminal, and be forwarded to the second SIM from the multi-SIM terminal. The second SIM can perform network measurement based on the target configuration information corresponding to itself, and/or report a network measurement result to the first SIM.

Figure 10:
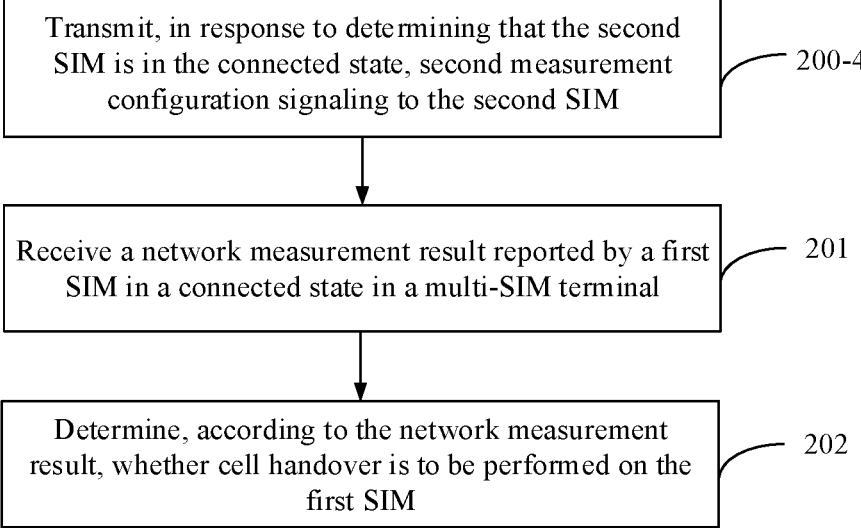
FIG. 10 is a schematic flowchart of another cell handover method illustrated in accordance with an example.

In an embodiment, referring to FIG. 10, which is a flowchart of another cell handover method illustrated according to the embodiment shown in FIG. 7, the method may further include:

at step 200-4, in response to determining that the second SIM is in the connected state, second measurement configuration signaling is transmitted to the second SIM.

In the embodiments of the present disclosure, when the second SIM is in the connected state, the base station can configure corresponding target configuration information for the second SIM, and transmit the configured target configuration information to the second SIM through the second measurement configuration signaling.

When the second SIM is switched to an idle state or an inactive state, the first SIM can inform the second SIM of performing network measurement. The second SIM can directly take the target configuration information, which is configured by the base station for the second SIM in the second measurement configuration signaling, as the target configuration information corresponding to itself.

In an embodiment, referring to FIG. 11, which is a flowchart of another cell handover method illustrated according to an embodiment, the method includes the following.

At step 301, when a first SIM on a multi-SIM terminal is in a connected state, the first SIM can transmit SIM information to a base station.

The SIM information can be used to inform the base station of information about other SIM(s) belonging to the same multi-SIM terminal as the first SIM.

At step 302, when the base station determines, according to the SIM information, a second SIM belonging to the same multi-SIM terminal as the first SIM, the base station can transmit first measurement configuration signaling to the first SIM.

The first measurement configuration signaling includes respective target configuration information configured by the base station for the first SIM and the second SIM.

At step 303, the first SIM can transmit the target configuration information corresponding to the second SIM in the first measurement configuration signaling to the multi-SIM terminal.

At step 304, the multi-SIM terminal can forward the target configuration information corresponding to the second SIM to the second SIM.

At step 305, the first SIM can transmit a state inquiry request to the base station.

The state query request can be used to query state information on the second SIM.

At step 306, the first SIM can receive the state information on the second SIM returned by the base station.

At step 307, the first SIM can transmit a measurement indication message to the multi-SIM terminal, in a case of the state information indicating that the second SIM is in an idle state or an inactive state and determining that a network measurement condition is satisfied.

The measurement indication message can be used to instruct the second SIM to perform network measurement.

At step 308, the multi-SIM terminal can forward the measurement indication message to the second SIM.

At step 309, the second SIM can perform the network measurement according to its own corresponding target configuration information, and/or report a network measurement result to the first SIM.

At step 310, when the network measurement result reported by the second SIM is obtained, the first SIM can report the network measurement result to the base station.

At step 311, the base station can determine, according to the network measurement result, whether cell handover is to be performed on the first SIM.

According to the above embodiment, when the first SIM on the multi-SIM terminal performs service processing, the second SIM on the multi-SIM terminal can perform network measurement. Since the first SIM and the second SIM belong to the same multi-SIM terminal, a network measurement result obtained by the second SIM may be consistent with a network measurement result obtained by the first SIM. In this way, by taking advantage of the multi-SIM terminal, the network measurement can be performed in advance through other SIMs on the multi-SIM terminal without affecting the service(s) of the first SIM, which can shorten the time length and time delay of handover and make the handover faster.

Corresponding to the above-mentioned embodiments of methods for implementing application functions, the present disclosure also provides embodiments of apparatuses for implementing application functions.

Figure 12:
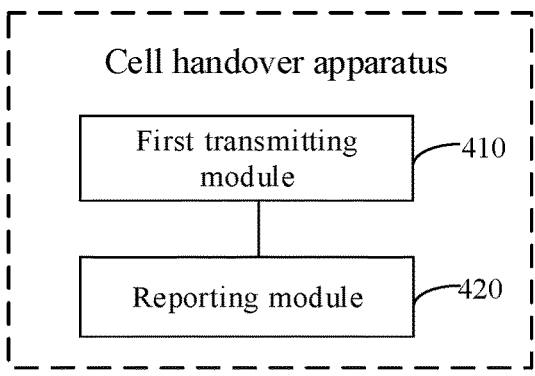
FIG. 12 is a block diagram of a cell handover apparatus illustrated in accordance with an example.

Referring to FIG. 12, which is a block diagram showing a cell handover apparatus in accordance with an embodiment. The apparatus is applied to a multi-Subscriber Identity Module (SIM) terminal, and include the following:

a first transmitting module 410, configured to inform, by a first SIM in the multi-SIM terminal when the first SIM is in a connected state, a second SIM in the multi-SIM terminal of performing network measurement; and a reporting module 420, configured to report, by the first SIM when the first SIM obtains a network measurement result from the second SIM, the network measurement result to a base station to which the first SIM is connected.

Figure 13:
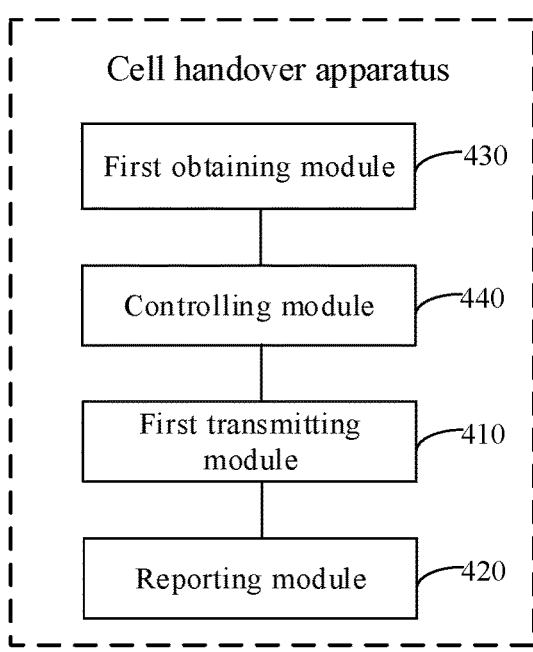
FIG. 13 is a block diagram of another cell handover apparatus illustrated in accordance with an example.

Referring to FIG. 13, which is a block diagram of another cell handover apparatus illustrated according to FIG. 12, the above-mentioned apparatus further includes:

a first obtaining module 430, configured to obtain, by the first SIM, state information on the second SIM; and a controlling module 440, configured to inform, by the first SIM, the second SIM of performing the network measurement, in a case that the state information indicates that the second SIM is in an idle state or an inactive state.

Figure 14:
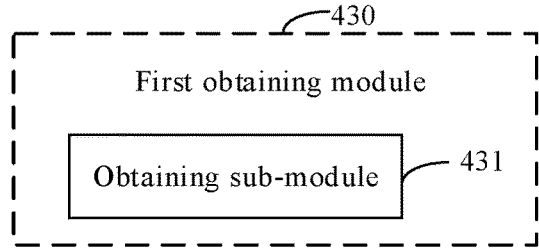
FIG. 14 is a block diagram of another cell handover apparatus illustrated in accordance with an example.

Referring to FIG. 14, which is a block diagram of another cell handover apparatus illustrated according to FIG. 13, the first obtaining module 430 includes:

an obtaining sub-module 431, configured to obtain, by the first SIM, the state information on the second SIM reported by the second SIM to the multi-SIM terminal.

Figure 15:
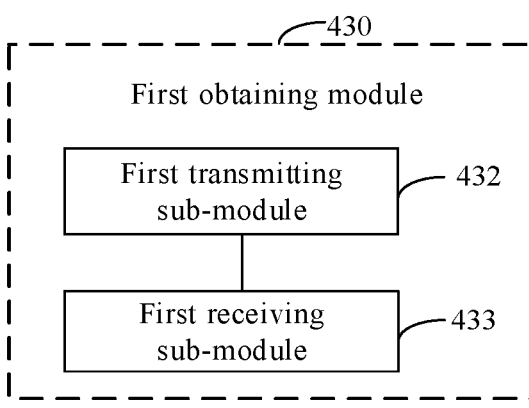
FIG. 15 is a block diagram of another cell handover apparatus illustrated in accordance with an example.

Referring to FIG. 15, which is a block diagram of another cell handover apparatus illustrated according to FIG. 13, the first obtaining module 430 includes:

a first transmitting sub-module 432, configured to transmit, by the first SIM, a state query request to the base station to which the first SIM is connected, where the state query request queries the state information on the second SIM; and a first receiving sub-module 433, configured to receive, by the first SIM, the state information on the second SIM returned by the base station.

Figure 16:
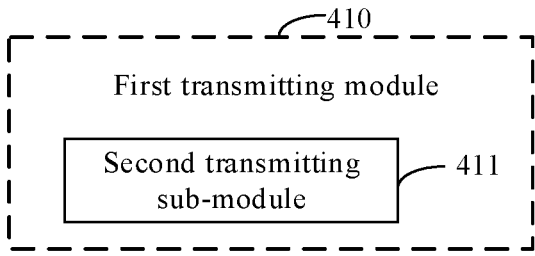
FIG. 16 is a block diagram of another cell handover apparatus illustrated in accordance with an example.

Referring to FIG. 16, which is a block diagram of another cell handover apparatus illustrated according to FIG. 12, the first transmitting module 410 includes:

a second transmitting sub-module 411, configured to inform, by the first SIM when the first SIM determines that a network measuring condition is satisfied, the second SIM in the multi-SIM terminal of performing the network measurement.

Figure 17:
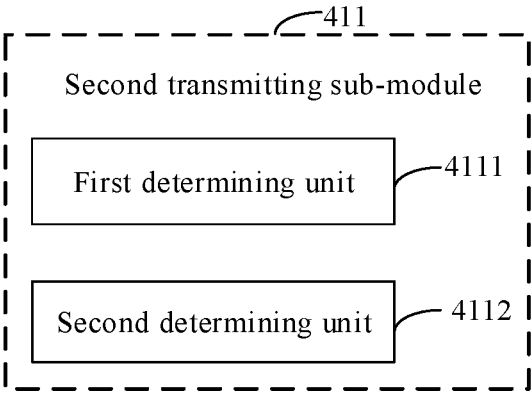
FIG. 17 is a block diagram of another cell handover apparatus illustrated in accordance with an example.

Referring to FIG. 17, which is a block diagram of another cell handover apparatus illustrated according to FIG. 16, the second transmitting sub-module 411 includes at least one of:

a first determining unit 4111, configured to determine that network signal quality related to the first SIM is lower than a predetermined threshold for more than a predetermined period of time; or a second determining unit 4112, configured to determine that a requirement related to Quality of Service (QoS) for the first SIM meets a predetermined condition.

Figure 18:
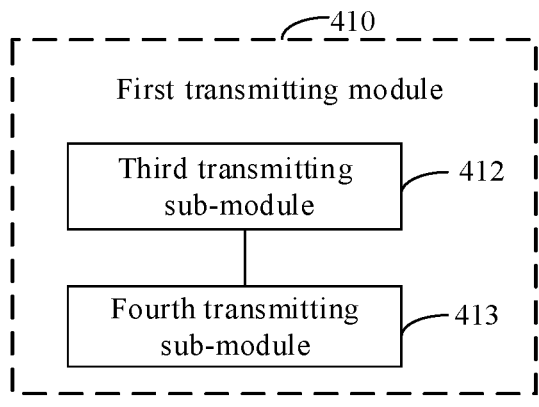
FIG. 18 is a block diagram of another cell handover apparatus illustrated in accordance with an example.

Referring to FIG. 18, which is a block diagram of another cell handover apparatus illustrated according to FIG. 12, the first transmitting module 410 includes:

a third transmitting sub-module 412, configured to transmit, by the first SIM, a measurement indication message to the multi-SIM terminal, where the measurement indication message indicates the second SIM to perform the network measurement; and a fourth transmitting sub-module 413, configured to forward, by the multi-SIM terminal, the measurement indication message to the second SIM.

Figure 19:
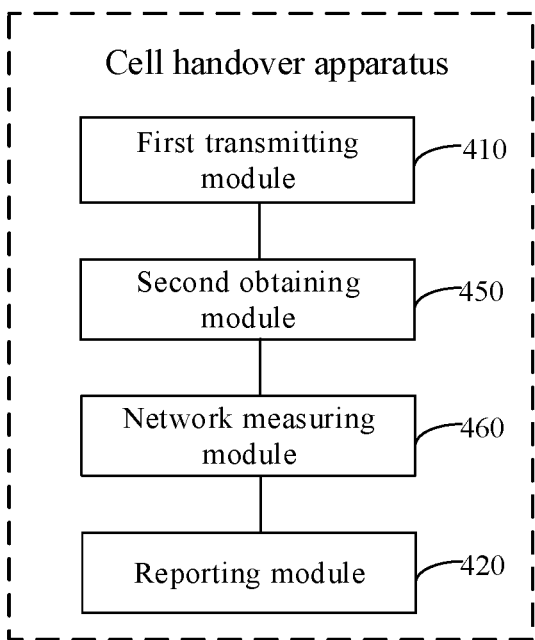
FIG. 19 is a block diagram of another cell handover apparatus illustrated in accordance with an example.

Referring to FIG. 19, which is a block diagram of another cell handover apparatus illustrated according to FIG. 12, the apparatus further includes:

a second obtaining module 450, configured to obtain, by the second SIM, target configuration information corresponding to the second SIM; and a network measuring module 460, configured to perform, by the second SIM, the network measurement based on the target configuration information, and/or report, by the second SIM, the network measurement result to the first SIM.

Figure 20:
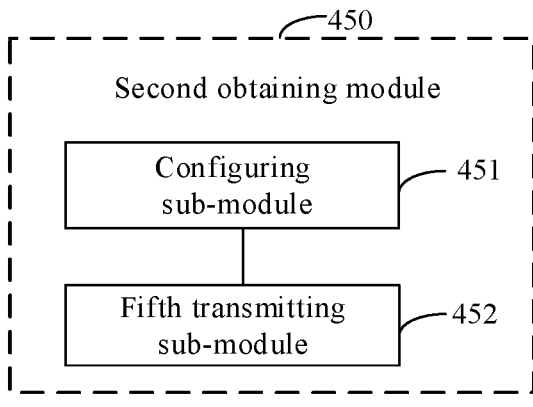
FIG. 20 is a block diagram of another cell handover apparatus illustrated in accordance with an example.

Referring to FIG. 20, which is a block diagram of another cell handover apparatus illustrated according to FIG. 19, the second obtaining module 450 includes:

a configuring sub-module 451, configured to configure and transmit, by the first SIM, the target configuration information corresponding to the second SIM to the multi-SIM terminal; and a fifth transmitting sub-module 452, configured to forward, by the multi-SIM terminal, the target configuration information corresponding to the second SIM to the second SIM.

Figure 21:
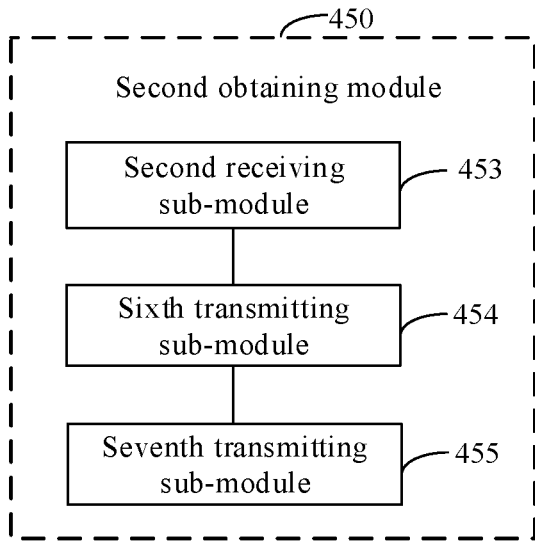
FIG. 21 is a block diagram of another cell handover apparatus illustrated in accordance with an example.

Referring to FIG. 21, which is a block diagram of another cell handover apparatus illustrated according to FIG. 19, the second obtaining module 450 includes:

a second receiving sub-module 453, configured to receive, by the first SIM, first measurement configuration signaling transmitted by the base station, where the first measurement configuration signaling includes respective target configuration information configured by the base station for the first SIM and the second SIM belonging to a same multi-SIM terminal; and a sixth transmitting sub-module 454, configured to transmit, by the first SIM, the target configuration information corresponding to the second SIM in the first measurement configuration signaling to the multi-SIM terminal; and a seventh transmitting sub-module 455, configured to forward, by the multi-SIM terminal, the target configuration information corresponding to the second SIM to the second SIM.

Figure 22:
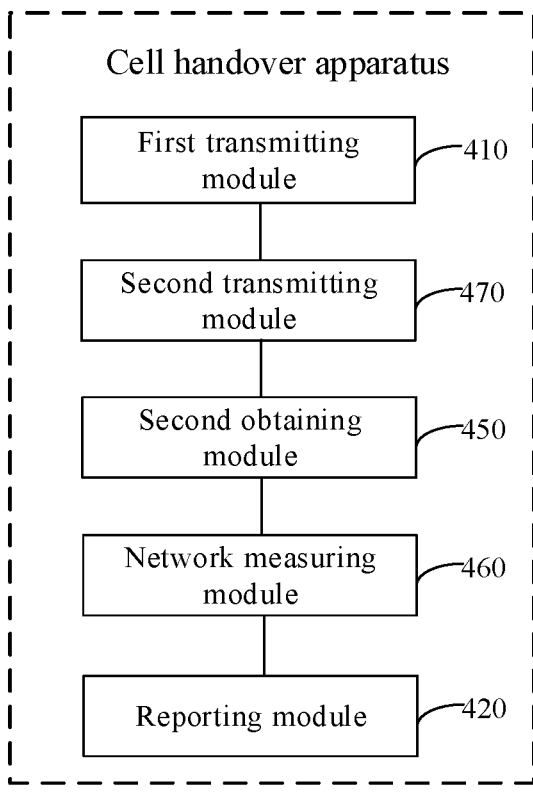
FIG. 22 is a block diagram of another cell handover apparatus illustrated in accordance with an example.

Referring to FIG. 22, which is a block diagram of another cell handover apparatus illustrated according to FIG. 19, the apparatus further includes:

a second transmitting module 470, configured to transmit, by the first SIM, SIM information to the base station, where the SIM information informs the base station of information about one or more other SIMs belonging to the same multi-SIM terminal as the first SIM.

Figure 23:
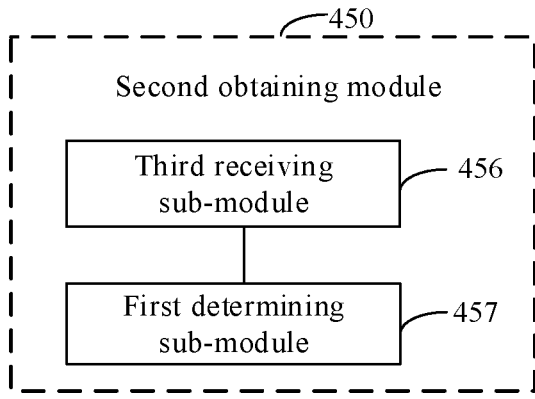
FIG. 23 is a block diagram of another cell handover apparatus illustrated in accordance with an example.

Referring to FIG. 23, which is a block diagram of another cell handover apparatus illustrated according to FIG. 19, the second obtaining module 450 includes:

a third receiving sub-module 456, configured to receive, when the second SIM is in the connected state, second measurement configuration signaling transmitted by the base station, where the second measurement configuration signaling includes the target configuration information configured by the base station for the second SIM; and a first determining sub-module 457, configured to take, in a case that the second SIM is switched to an idle state or to an inactive state, the target configuration information configured by the base station for the second SIM in the second measurement configuration signaling as the target configuration information corresponding to the second SIM.

In some examples, the target configuration information includes at least one of:

measurement configuration information indicating a measurement content for the second SIM to perform the network measurement; or reporting configuration information indicating a condition for the second SIM to report the network measurement result to the first SIM.

Figure 24:
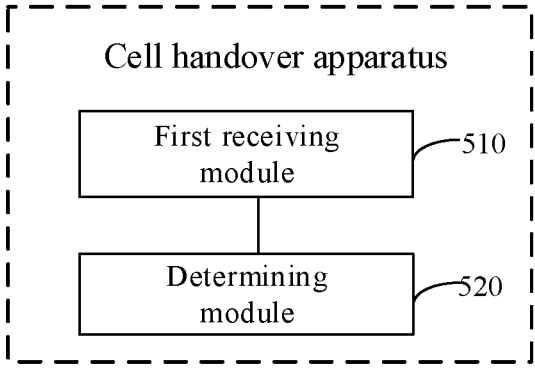
FIG. 24 is a block diagram of another cell handover apparatus illustrated in accordance with an example.

Referring to FIG. 24, which is a block diagram of another cell handover apparatus illustrated according to an embodiment. The apparatus is applied to a base station and includes:

a first receiving module 510, configured to receive a network measurement result reported by a first Subscriber Identity Module (SIM) in a connected state in a multi-SIM terminal, where the network measurement result is obtained by another SIM in the multi-SIM terminal performing network measurement; and a determining module 520, configured to determine, according to the network measurement result, whether cell handover is to be performed on the first SIM.

Figure 25:
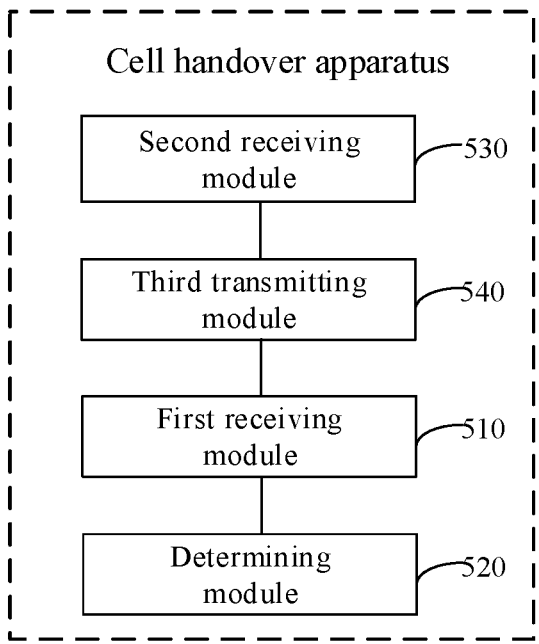
FIG. 25 is a block diagram of another cell handover apparatus illustrated in accordance with an example.

Referring to FIG. 25, which is a block diagram of another cell handover apparatus illustrated according to FIG. 24. The apparatus further includes:

a second receiving module 530, configured to receive a state query request transmitted by the first SIM, where the state query request queries state information on a second SIM; and a third transmitting module 540, configured to transmit, based on the state query request, the state information on the second SIM to the first SIM.

Referring to FIG. 26 which is a block diagram of another cell handover apparatus illustrated according to FIG. 24. The apparatus further includes:

a fourth transmitting module 550, configured to transmit, when a second SIM belonging to a same multi-SIM terminal as the first SIM is determined, first measurement configuration signaling to the first SIM, where the first measurement configuration signaling includes respective target configuration information configured by the base station for the first SIM and the second SIM.

Referring to FIG. 27 which is a block diagram of another cell handover apparatus illustrated according to FIG. 26. The fourth transmitting module 550 includes:

a second determining sub-module 551, configured to take, according to SIM information reported by the first SIM, another SIM belonging to the same multi-SIM terminal as the first SIM as the second SIM, where the SIM information informs the base station of information about one or more other SIMs belonging to the same multi-SIM terminal as the first SIM; or an eighth transmitting sub-module 552, configured to determine the second SIM according to one or more other SIMs that belong to the same multi-SIM terminal as the first SIM and are transmitted by a core network.

Referring to FIG. 28 which is a block diagram of another cell handover apparatus illustrated according to FIG. 24. The apparatus further includes:

a fifth transmitting module 560, configured to transmit, in response to determining that a second SIM is in the connected state, second measurement configuration signaling to the second SIM, where the second measurement configuration signaling includes target configuration information configured by the base station for the second SIM.

In some examples, the target configuration information includes at least one of:

measurement configuration information indicating a measurement content for the second SIM to perform the network measurement; or reporting configuration information indicating a condition for the second SIM to report the network measurement result to the first SIM.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, i.e., may be located in one place, or may be distributed to a plurality of network units. Part or all of the modules may be selected according to actual needs to implement the objectives of the solutions in the examples. Those of ordinary skill in the art may understand and carry out them without creative work.

Accordingly, the present disclosure further provides a computer readable storage medium, where the storage medium stores a computer program, and the computer program executes any one of the cell handover methods applied to a multi-SIM terminal side.

Accordingly, the present disclosure further provides a computer readable storage medium, where the storage medium stores a computer program, and the computer program executes any one of the cell handover methods applied to a base station side.

Accordingly, the present disclosure further provides a cell handover device, that is applicable to a multi-SIM terminal, including:

a processor, a memory storing instructions executable by the processor;

where the processor is configured to perform any one of the cell handover methods applied to the multi-SIM terminal side.

Figure 29:
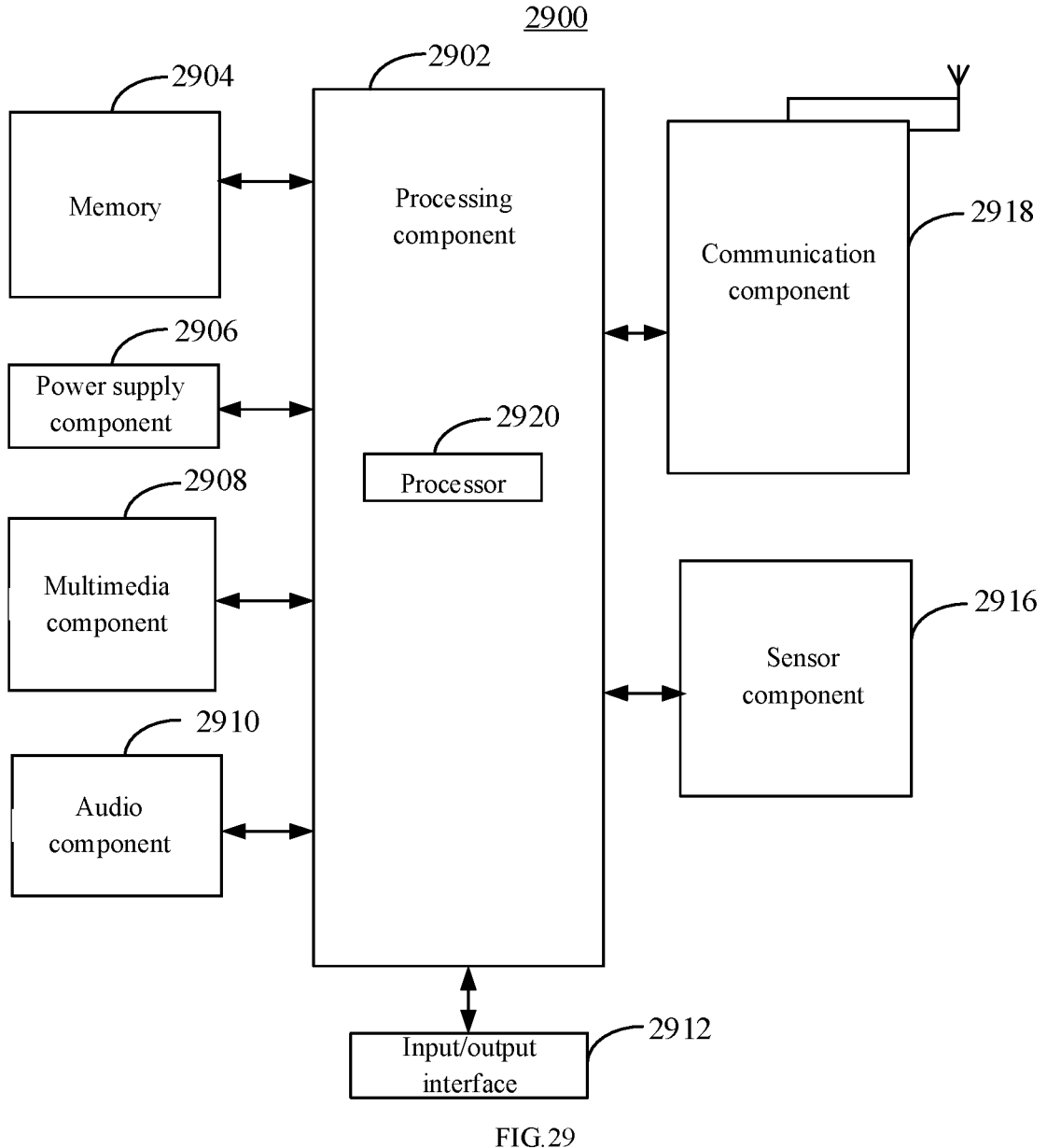
FIG. 29 is a structural schematic diagram of a cell handover device illustrated in accordance with an example of the present disclosure.

FIG. 29 is a block diagram illustrating an electric apparatus 2900 according to an embodiment of the present disclosure. For example, the apparatus 2900 may be a multi-SIM terminal.

Referring to FIG. 29, the apparatus 2900 may include one or more of the following components: a processing component 2902, a memory 2904, a power supply component 2906, a multimedia component 2908, an audio component 2910, an input/output (I/O) interface 2912, a sensor component 2916 and a communication component 2918.

The processing component 2902 generally controls overall operations of the apparatus 2900, such as operations associated with display, phone calls, data communications, camera operations, and recording operations. The processing component 2902 may include one or more processors 2920 to execute instructions to complete all or part of the steps of the above cell handover methods. In addition, the processing component 2902 may include one or more modules which facilitate the interaction between the processing component 2902 and other components. For example, the processing component 2902 may include a multimedia module to facilitate the interaction between the multimedia component 2908 and the processing component 2902. For another example, the processing component 2902 can read executable instructions from the memory to implement the steps of the cell handover methods provided by the above embodiments.

The memory 2904 is configured to store various types of data to support the operation of the apparatus 2900. Examples of such data include instructions for any application or method operated on the apparatus 2900, contact data, phonebook data, messages, pictures, videos, and so on. The memory 2904 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 2906 supplies power for different components of the apparatus 2900. The power supply component 2906 may include a power supply management system, one or more power supplies, and other components associated with generating, managing and distributing power for the apparatus 2900.

The multimedia component 2908 includes a screen that provides an output interface between the apparatus 2900 and a user. In some embodiments, the multimedia component 2908 includes a front camera and/or a rear camera. When the apparatus 2900 is in an operation mode, such as a shooting mode or a video mode, the front camera and/or the rear camera may receive external multimedia data. Each of the front and rear cameras may be a fixed optical lens system or have a focal length and an optical zoom capability.

The audio component 2910 is configured to output and/or input audio signals. For example, the audio component 2910 includes a microphone (MIC) configured to receive an external audio signal when the apparatus 2900 is in an operation mode, such as a call mode, a recording mode, and a voice recognition mode. The received audio signal may be further stored in the memory 2904 or transmitted via the communication component 2918. In some embodiments, the audio component 2910 also includes a loudspeaker for outputting an audio signal.

The I/O interface 2912 provides an interface between the processing component 2902 and a peripheral interface module which may be a keyboard, a click wheel, a button, or the like. These buttons may include, but are not limited to a home button, a volume button, a start button, and a lock button.

The sensor component 2916 includes one or more sensors for providing a status assessment in various aspects to the apparatus 2900. For example, the sensor component 2916 may detect an open/closed state of the apparatus 2900, and the relative positioning of components, for example, the component is a display and a keypad of the apparatus 2900. The sensor component 2916 may also detect a change in position of the apparatus 2900 or a component of the apparatus 2900, the presence or absence of a user in contact with the apparatus 2900, the orientation or acceleration/deceleration of the apparatus 2900, and a change in temperature of the apparatus 2900. The sensor component 2916 may include a proximity sensor configured to detect the presence of nearby objects without any physical contact. The sensor component 2916 may also include a light sensor, such as a CMOS or CCD image sensor, for use in imaging applications. In some embodiments, the sensor component 2916 may also include an acceleration sensor, a gyro sensor, a magnetic sensor, a pressure sensor, or a temperature sensor.

The communication component 2918 is configured to facilitate wired or wireless communication between the apparatus 2900 and other devices. The apparatus 2900 may access a wireless network based on a communication standard, such as WiFi, 2G, 3G, 4G, or 5G, or a combination thereof. In an embodiment, the communication component 2918 receives broadcast signals or broadcast associated information from an external broadcast management system via a broadcast channel. In an embodiment, the communication component 2918 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the apparatus 2900 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the above cell handover methods.

In an embodiment, there is also provided a non-transitory computer readable storage medium including instructions, such as a memory 2904, where the instructions are executable by the processor 2920 of the apparatus 2900 to perform the cell handover methods as described above. For example, the non-transitory computer readable storage medium may be ROM, RAM, CD-ROM, magnetic tape, floppy disk, and optical data storage device and the like.

Accordingly, the present disclosure further provides a cell handover device, that is applicable to a base station, including:

a processor, a memory storing instructions executable by the processor;

where the processor is configured to perform any one of the cell handover methods applied to the base station side.

Figure 30:
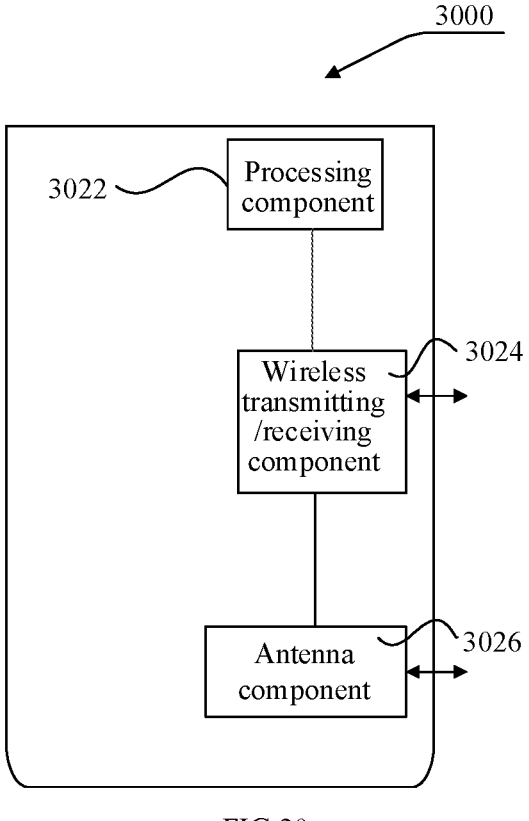
FIG. 30 is a structural schematic diagram of another cell handover device illustrated in accordance with an example of the present disclosure.

As shown in FIG. 30, which is a structural schematic diagram showing a cell handover device 3000 in accordance with an example. The device 3000 may be provided as a base station. Referring to FIG. 30, the device 3000 may include a processing component 3022, a wireless transmitting/receiving component 3024, an antenna component 3026, and a signal processing portion specific to a wireless interface. The processing component 3022 may further include one or more processors.

One of the processors in the processing component 3022 may be configured to perform any one of the cell handover methods described above on the base station side.

Technical solutions provided by the embodiments of the present disclosure may include the following beneficial effects.

In the embodiments of the present disclosure, while the first SIM on the multi-SIM terminal is performing service processing, the second SIM on the multi-SIM terminal can perform network measurement. Since the first SIM and the second SIM belong to the same multi-SIM terminal, a network measurement result obtained by the second SIM is consistent with a network measurement result obtained by the first SIM. In this way, by taking advantages of the multi-SIM terminal, the network measurement can be performed in advance through other SIMs on the multi-SIM terminal without affecting service(s) of the first SIM, which can shorten the time length and time delay of handover and make the handover faster.

In the embodiments of the present disclosure, to alleviate affecting service(s) of the second SIM on the multi-SIM terminal, the first SIM can obtain the state information on the second SIM, so as to make the second SIM perform the network measurement when the second SIM is in the idle state or the inactive state, which has high availability.

In the embodiments of the present disclosure, the first SIM may obtain the state information on the second SIM reported by the second SIM to the multi-SIM terminal, or the first SIM may query the network side for the state information on the second SIM, which is easy to implement and has high availability.

In the embodiments of the present disclosure, the first SIM may notify the second SIM of performing the network measurement once the first SIM enters the connected state. Or, the first SIM may notify, while being in the connected state and determining that a network measurement condition is satisfied, the second SIM of performing the network measurement. As such, the network measurement can be performed in advance through other SIMs on the multi-SIM terminal, which can shorten the time length and time delay of handover, and make the handover faster.

In the embodiments of the present disclosure, the first SIM can transmit a measurement indication message to the second SIM through the multi-SIM terminal, thereby informing the second SIM of performing the network measurement, which is easy to implement and has high availability.

In the embodiments of the present disclosure, the second SIM can perform network measurement based on the obtained target configuration information corresponding to itself, and/or report the network measurement result to the first SIM. For example, the corresponding target configuration information for the second SIM may be configured by the first SIM. Or, respective target configuration information may be simultaneously configured for the first SIM and the second SIM by the base station through the first configuration signaling, and the target configuration information corresponding to the second SIM may be forwarded by the first SIM to the second SIM. Or, when the second SIM is in the connected state, target configuration information can be pre-configured for the second SIM by the base station through the second configuration signaling. When the second SIM is switched to the idle state or the inactive state, the target configuration information in the second configuration information is directly used to perform network measurement and/or report a network measurement result to the first SIM. The methods have high availability.

Other implementations of the present disclosure will be apparent to those skilled in the art from consideration of the specification and practice of the present disclosure herein. The present disclosure is intended to cover any variations, uses, modifications or adaptations of the present disclosure that follow the general principles thereof and include common knowledge or conventional technical means in the related art that are not disclosed in the present disclosure. The specification and embodiments are considered as examples only.

It is to be understood that the present disclosure is not limited to the precise structure described above and shown in the accompanying drawings, and that various modifications and changes may be made without departing from the scope thereof.

The invention claimed is:

1. A cell handover method, the method being applicable to a multi-Subscriber Identity Module (SIM) terminal, the method comprising:

informing, by a first SIM in the multi-SIM terminal when the first SIM is in a connected state, a second SIM in the multi-SIM terminal of performing network measurement;

reporting, by the first SIM when the first SIM obtains a network measurement result from the second SIM, the network measurement result to a base station to which the first SIM is connected;

obtaining, by the second SIM, target configuration information corresponding to the second SIM;

performing, by the second SIM, the network measurement based on the target configuration information; and reporting, by the second SIM, the network measurement result to the first SIM.

2. The method according to claim 1, further comprising:

when the first SIM in the multi-SIM terminal is in the connected state, obtaining, by the first SIM, state information on the second SIM; and informing, by the first SIM, the second SIM of performing the network measurement, in a case that the state information indicates that the second SIM is in an idle state or an inactive state.

3. The method according to claim 2, wherein obtaining, by the first SIM, the state information on the second SIM comprises:

obtaining, by the first SIM, the state information on the second SIM reported by the second SIM to the multi-SIM terminal; or transmitting, by the first SIM, a state query request to the base station to which the first SIM is connected, wherein the state query request queries the state information on the second SIM; and receiving, by the first SIM, the state information on the second SIM returned by the base station.

4. The method according to claim 1, wherein informing, by the first SIM, the second SIM in the multi-SIM terminal of performing the network measurement comprises:

informing, by the first SIM when the first SIM determines that a network measuring condition is satisfied, the second SIM in the multi-SIM terminal of performing the network measurement.

5. The method according to claim 4, wherein the first SIM determining that the network measuring condition is satisfied comprises:

determining that network signal quality related to the first SIM is lower than a predetermined threshold for more than a predetermined period of time; or determining that a requirement related to Quality of Service (QoS) for the first SIM meets a predetermined condition.

6. The method according to claim 1, wherein informing, by the first SIM, the second SIM in the multi-SIM terminal of performing the network measurement comprises:

transmitting, by the first SIM, a measurement indication message to the multi-SIM terminal, wherein the measurement indication message indicates the second SIM to perform the network measurement; and forwarding, by the multi-SIM terminal, the measurement indication message to the second SIM.

7. The method according to claim 1, wherein obtaining, by the second SIM, the target configuration information corresponding to the second SIM comprises:

configuring and transmitting, by the first SIM, the target configuration information corresponding to the second SIM to the multi-SIM terminal; and forwarding, by the multi-SIM terminal, the target configuration information corresponding to the second SIM to the second SIM.

8. The method according to claim 1, wherein obtaining, by the second SIM, the target configuration information corresponding to the second SIM comprises:

receiving, by the first SIM, first measurement configuration signaling transmitted by the base station, wherein the first measurement configuration signaling comprises respective target configuration information configured by the base station for the first SIM and the second SIM belonging to a same multi-SIM terminal;

transmitting, by the first SIM, the target configuration information corresponding to the second SIM in the first measurement configuration signaling to the multi-SIM terminal; and forwarding, by the multi-SIM terminal, the target configuration information corresponding to the second SIM to the second SIM.

9. The method according to claim 8, further comprising:

transmitting, by the first SIM, SIM information to the base station, wherein the SIM information informs the base station of information about one or more other SIMs belonging to the same multi-SIM terminal as the first SIM.

10. The method according to claim 1, wherein obtaining, by the second SIM, the target configuration information corresponding to the second SIM comprises:

receiving, when the second SIM is in the connected state, second measurement configuration signaling transmitted by the base station, wherein the second measurement configuration signaling comprises the target configuration information configured by the base station for the second SIM; and taking, in a case that the second SIM is switched to an idle state or to an inactive state, the target configuration information configured by the base station for the second SIM in the second measurement configuration signaling as the target configuration information corresponding to the second SIM.

11. The method according to claim 1, wherein the target configuration information comprises at least one of:

measurement configuration information indicating a measurement content for the second SIM to perform the network measurement; or reporting configuration information indicating a condition for the second SIM to report the network measurement result to the first SIM.

12. A cell handover device, comprising:

a processor, a memory storing instructions executable by the processor;

wherein the processor is configured to perform operations comprising:

informing, by a first Subscriber Identity Module (SIM) in a multi-SIM terminal when the first SIM is in a connected state, a second SIM in the multi-SIM terminal of performing network measurement;

reporting, by the first SIM when the first SIM obtains a network measurement result from the second SIM, the network measurement result to a base station to which the first SIM is connected;

obtaining, by the second SIM, target configuration information corresponding to the second SIM;

performing, by the second SIM, the network measurement based on the target configuration information; and reporting, by the second SIM, the network measurement result to the first SIM.

* * * * *